(12) United States Patent
Saccomanno

(10) Patent No.: US 7,106,936 B2
(45) Date of Patent: Sep. 12, 2006

(54) HOMOGENIZER FOR COLLIMATED LIGHT CONTROLLED HIGH ANGLE SCATTER

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 240 days.

(21) Appl. No.: 10/752,461

(22) Filed: Jan. 6, 2004

(65) Prior Publication Data

US 2004/0141308 A1 Jul. 22, 2004

Related U.S. Application Data

(60) Provisional application No. 60/439,886, filed on Jan. 14, 2003.

(51) Int. Cl.
    *G02B 6/10* (2006.01)

(52) U.S. Cl. ............ 385/129; 385/146; 385/147; 385/901

(58) Field of Classification Search ............ 385/43, 385/129, 130, 133, 146, 147, 901
    See application file for complete search history.

(56) References Cited

U.S. PATENT DOCUMENTS

| | | | |
|---|---|---|---|
| 3,670,260 A * | 6/1972 | Koester et al. ............ 372/9 |
| 4,260,220 A | 4/1981 | Whitehead | |
| 4,744,615 A * | 5/1988 | Fan et al. ............ 385/146 |
| 5,224,200 A * | 6/1993 | Rasmussen et al. ........ 385/146 |
| 5,321,789 A | 6/1994 | Kida et al. | |
| 5,390,276 A | 2/1995 | Tai et al. | |
| 5,521,725 A | 5/1996 | Beeson et al. | |
| 5,772,305 A | 6/1998 | Ishikawa et al. | |
| 6,222,598 B1 | 4/2001 | Haiyama et al. | |
| 6,266,473 B1 | 7/2001 | Saccomanno et al. | |
| 6,313,957 B1 * | 11/2001 | Heemstra et al. ........... 359/738 |
| 6,347,176 B1 * | 2/2002 | Hawryluk et al. .......... 385/133 |
| 6,421,103 B1 | 7/2002 | Yamaguchi | |
| 6,428,198 B1 | 8/2002 | Saccomanno et al. | |
| 6,443,585 B1 | 9/2002 | Saccomanno | |
| 6,672,739 B1 * | 1/2004 | Argyle et al. ............... 362/259 |
| 2001/0048801 A1 | 12/2001 | Saccomanno | |
| 2004/0028369 A1* | 2/2004 | Aylward et al. ............ 385/145 |

FOREIGN PATENT DOCUMENTS

| EP | 1 139 015 | 10/2001 |
| JP | 8-338962 | * 12/1996 |

OTHER PUBLICATIONS

PCT International Search Report; PCT/US2004/000660; Jul. 5, 2004.

* cited by examiner

*Primary Examiner*—John D. Lee
(74) *Attorney, Agent, or Firm*—Kurt A. Luther

(57) ABSTRACT

A homogenizer for collimated light limits the angular distribution of the light by passing the light through a mild diffuser followed by a slab light guide which has top and bottom surfaces covered with optical constraining layers and optical absorbing layers where the optical absorbing layer has a higher refractive index than the optical constraining layer and the optical constraining layer has a lower refractive index than the slab light guide.

16 Claims, 2 Drawing Sheets

HOMOGENIZER FOR COLLIMATED LIGHT CONTROLLED HIGH ANGLE SCATTER

CROSS REFERENCE TO RELATED APPLICATIONS

This application is based on U.S. Provisional Application Ser. No. 60/439886, entitled "Homogenizer for Collimated Light With Controlled High Angle Scatter", filed on Jan. 14, 2003, the teachings of which are incorporated herein by reference.

TECHNICAL FIELD

The present invention relates to efficiently homogenizing collimated light entering a light guide and more specifically to backlighting a liquid crystal display (LCD).

BACKGROUND OF THE INVENTION

It is known that the use of a collimated backlight and a front diffusing screen can greatly improve the quality of an LCD. One such approach is described in Saccomanno (U.S. Pat. No. 6,428,198), which is incorporated herein by reference. Saccomanno describes the use of an arc lamp, whose light is collected, homogenized, and coupled into an array of optical conduits. Each conduit then illuminates a non-imaging optic, which collimates the light and subsequently illuminates the edge of a light-extraction guide.

Even though my prior patent teaches an effective collimated light and diffuser screen arrangement, for certain applications such as medical imaging there is a need to improve black-level contrast and image sharpness even at the expense of a slightly larger and less light efficient device.

SUMMARY OF THE INVENTION

In accordance with my present invention, a mild diffuser, having controlled scattering angles, is placed at the input aperture of a slab light guide. This mild diffuser is inserted between the collimation source (e.g. non-imaging optics) and the light extraction guide. Unlike the diffusers that have been previously used in diffuse backlights, the diffuser in accordance with my invention has a controlled scattering angle of less than about eight degrees and most advantageously of less than +/−5 degree full-width half-maximum (FWHM) scatter and is referred to herein as a 'mild diffuser' to contrast it from the prior art diffuser arrangements. The slab light guide further serves to homogenize the collimated beam. The slab light guide may be a separate element from the light extraction guide or the light extraction guide may have a "lead-in" portion that comprises a homogenizing slab section.

This homogenizer technique is especially useful in overcoming irregularities due to periodic structures that supply the source of collimated light. Since any diffuser will naturally increase the overall beam divergence, an optical constraining layer, having a refractive index slightly less than the refractive index of the slab light guide, is positioned on one or more outer surfaces of the slab light guide. A light absorbing black layer is then positioned on the optical constraining layer or layers, the light absorbing layer having a higher refractive index than the slab light guide and the optical constraining layer. The result of this combination is that the slab light guide now can strip out high angle light.

Such high angle light will cause increasing fuzziness between adjacent pixels and also cause a net lowering of the black-level contrast; this effect is described in Yamaguchi (U.S. Pat. No. 6,421,103). The light exiting the slab light guide is thus homogenized and stripped of high-angle light and can be fed into the light extraction guide, providing a uniform output.

DETAILED DESCRIPTION OF THE INVENTION

Figure 1:
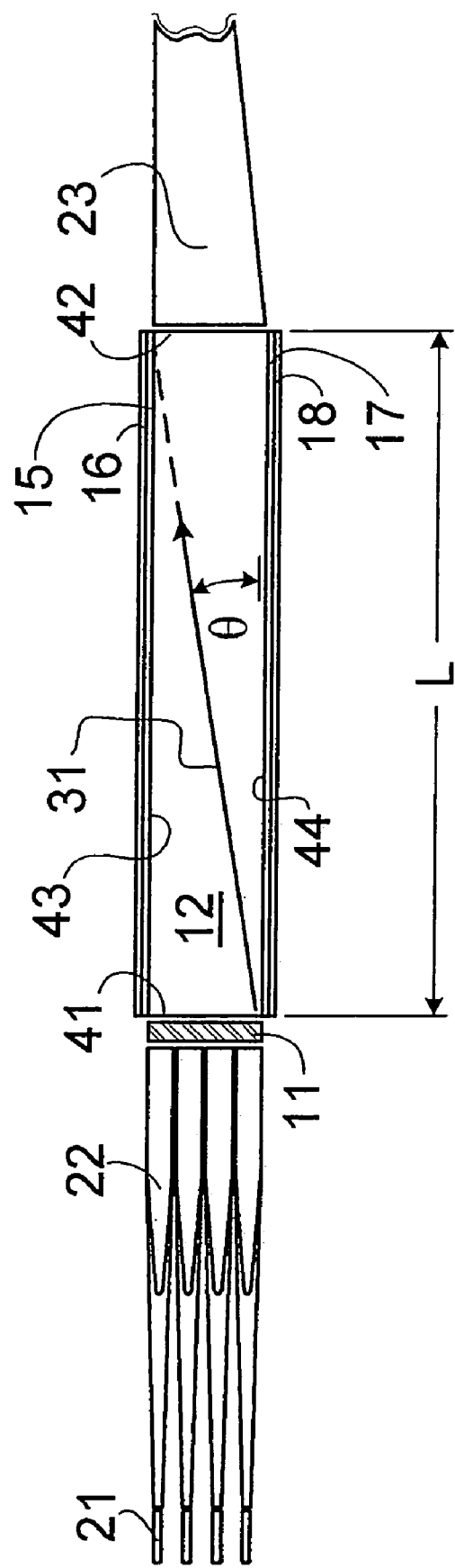
FIG. 1 illustrates a homogenizer in accordance with one illustrative embodiment of the present invention.

Referring first to FIG. 1, an acrylic (although other optical quality materials may be used) slab light guide 12, having a first refractive index, is covered on its top surface 43 with an optical constraining layer 15, such as an acrylic pressure sensitive adhesive (PSA). A type of PSA that is suitable for my invention is Rexam OCAV3. The optical constraining layer 15 has a second refractive index, which is slightly less than the refractive index of the slab light guide 12. In one embodiment of my invention, the acrylic slab light guide 12 has a refractive index of 1.4893 while the optical constraining layer 15 has a refractive index of 1.4800.

Because of the slight difference in refractive index, the optical constraining layer 15 acts to trap light within the light guide under certain conditions. Accordingly, collimated light that enters the acrylic slab light guide 12 at surface 41 through a mild diffuser 11 with an angular spread below a certain threshold value is contained within the slab light guide 12 by total internal reflection (TIR). Light with an angular spread above the threshold value exits the slab light guide 12 and enters the optical constraining layer 15. In embodiments of my invention using PSA as the optical constraining layer 15, it also mechanically functions to adhesively fasten an optical absorbing layer 16, such as for example, Dupont Kapton CB black polyimide, to the slab light guide 12, forming a sandwich structure therewith.

In other embodiments of my invention the optical absorbing layer is disposed on the optical constraining layer, for example, in certain embodiments, the optical constraining layer 15 is a thin film coating on the acrylic slab 12 and the optical absorbing layer is a black paint overcoat, such as for example Krylon Ultra-Flat or Tetenal Kameralack. Note that the optical constraining layer must be thick enough, for example three wavelengths of light, so that the total internally reflected light is not inadvertently absorbed due to the evanescent aspect of light reaching the black layer.

The optical absorbing layer 16 has a refractive index that is greater than the refractive index of optical constraining layer 15. This difference in refractive indices causes the light within the optical constraining layer 15, that is, the light that has not been contained by TIR within the light guide, to exit into the optical absorbing layer 16 where it is absorbed.

Advantageously, the mild diffuser allows for the mixing of discrete collimated light sources, such as non-imaging collimators 22 that are optically driven from optical fibers 21. Suitable mild diffusers are available from Reflexite (Avon, Conn.), part numbers BP336, BP302 and BP321 having symmetric half angles of +/−3.9 degrees, +/−3.8 degrees, and +/−2.8 degrees, respectively. From lab testing, it has been determined that BP321 is preferred when used in combination with a "SolarTec CL Light" fiber optic illuminator from Wavien, Inc. (Santa Clarita, Calif.), ESKA SK60 fibers from Mitsubishi Rayon Co. (Tokyo, Japan), and Poly II acrylic from Polycast (Stamford, Conn.). In other embodiments of my invention, the mild diffuser 11 is embossed on the entrance aperture of the slab light guide 12.

Light that is angularly limited below the threshold limit passes through the slab light guide 12 and exits at surface 42. Advantageously, this angularly limited collimated light is especially suitable for a wedge light extraction guide 23 as may be found behind a liquid crystal display (LCD).

In certain embodiments of my invention, the lower surface 44 of the slab light guide 12 has a second optical constraining layer 17 and a second optical absorbing layer 18 disposed thereon. These optical layers function in the same manner as previously described optical constraining layer 15 and optical absorbing layer 16.

Figure 2:
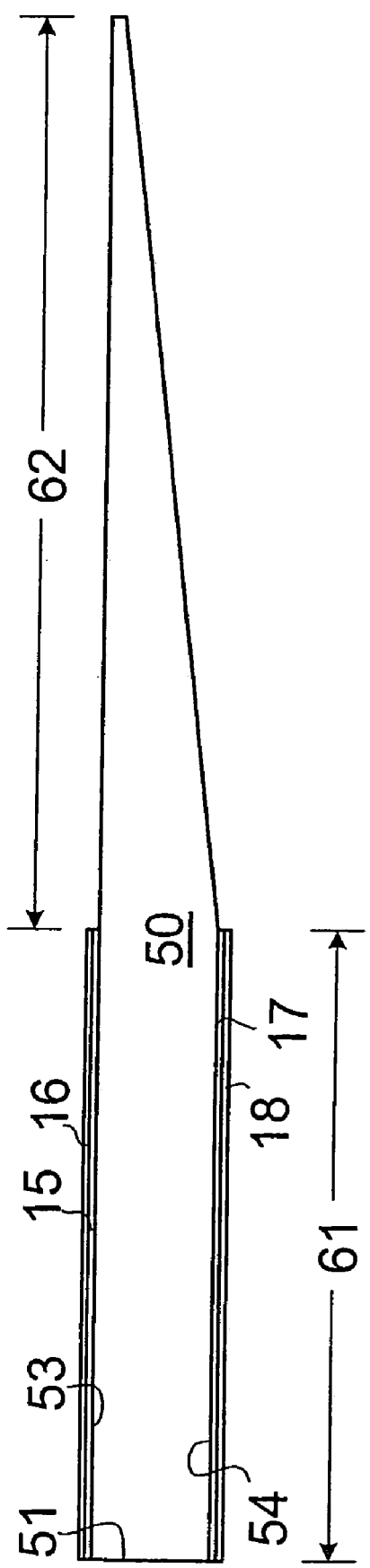
FIG. 2 illustrates a homogenizer in accordance with my invention in combination with a wedge shaped light extraction guide.

Referring now to FIG. 2, there is depicted another illustrative embodiment of the present invention. In this embodiment, the mild diffuser, slab light guide, and wedge light extraction guide are fashioned from the same monolithic substrate 50, preferably acrylic. The monolithic substrate 50 comprises two distinct regions, a constant cross-section slab light guide region 61 and a wedge-shaped light extraction guide region 62. The light enters the slab light guide region 61 through an embossed entrance diffuser 51. Similar to the previous embodiment, the slab light guide region 61 includes an upper surface 53 and a lower surface 54.

The upper surface 53 and the lower surface 54 are covered with optical constraining layers 15 and 17, respectively as in the prior embodiment. The optical constraining layers 15 and 17 each have a second refractive index, which is slightly less than the refractive index of the monolithic substrate 50. Because of the slight difference in refractive index, the optical constraining layers 15 and 17 act to trap light within the slab light guide region 61 under certain conditions. Accordingly, collimated light that enters the monolithic substrate 50 through embossed entrance diffuser 51 with an angular spread below a certain threshold value is contained within the monolithic substrate 50 by total internal reflection (TIR). Light with an angular spread above the threshold value exits the monolithic substrate 50 and enters the optical constraining layers 15 and 17.

Disposed on the optical constraining layers 15 and 17 are optical absorbing layers 16 and 18, respectively. The optical absorbing layers 16 and 18 each have a refractive index that is greater than the refractive index of optical constraining layers 15 and 17. This difference in refractive indices causes the light within the optical constraining layers 15 and 17, that is, the light that has not been contained by TIR within the monolithic substrate 50, to exit into the optical absorbing layers 16 and 18, where it is absorbed.

Table 1 below details results of the Snell's law calculations for a certain illustrative embodiment of my invention comprising a 6-millimeter thick acrylic slab with a refractive index of 1.4893, and an optical constraining layer formed from a PSA with a refractive index of 1.4800. These calculations detail input light angles from 5 to 23 degrees in air. The calculations show that light with a divergence angle of greater than 10 degrees is absorbed. Also shown in Table 1 is the minimum slab length required for the input light to have at least one reflection into the optical constraining layer. For example, for light having angles 10 degrees and greater to get absorbed the slab length needs to be at least two inches long.

TABLE 1

| Input Light Angle (degrees) | Light Angl within slab ( ) (degrees) | Minimum Slab Length (mm) | Light Angle into PSA (degrees) |
| --- | --- | --- | --- |
| 5.0000 | 3.3549 | 102.36 | TIR |
| 6.0000 | 4.0247 | 85.28 | TIR |
| 7.0000 | 4.6938 | 73.08 | TIR |
| 8.0000 | 5.3620 | 63.93 | TIR |
| 9.0000 | 6.0294 | 56.81 | TIR |
| 10.000 | 6.6958 | 51.11 | 88.049 |
| 11.000 | 7.3610 | 46.45 | 86.367 |
| 12.000 | 8.0249 | 42.56 | 85.157 |
| 13.000 | 8.6875 | 39.27 | 84.120 |
| 14.000 | 9.3486 | 36.45 | 83.177 |
| 15.000 | 10.008 | 34.00 | 82.295 |
| 16.000 | 10.666 | 31.86 | 81.455 |
| 17.000 | 11.322 | 29.97 | 80.646 |
| 18.000 | 11.976 | 28.29 | 79.861 |
| 19.000 | 12.627 | 26.79 | 79.096 |
| 20.000 | 13.277 | 25.43 | 78.347 |
| 21.000 | 13.924 | 24.21 | 77.612 |
| 22.000 | 14.568 | 23.09 | 76.889 |
| 23.000 | 15.210 | 22.07 | 76.176 |

ALTERNATE EMBODIMENTS

Alternate embodiments may be devised without departing from the spirit or the scope of the invention. For example, an array of collimated light emitting diodes (LED) or low numerical aperture fibers can be ass input sources in lieu of the non-imaging collimated light sources comprising collimators 22 and optical fibers 23. Also, the light guides need not be solid, but can be hollow by use of TIR films, such as that described in Whitehead (U.S. Pat. No. 4,260,220).

What is claimed is:

1. A homogenizer for collimated light comprising:
    a total internal reflection light guide having a first refractive index, said light guide having an entrance, an upper surface, and a lower surface;
    a mild diffuser covering said entrance, said mild diffuser having a controlled scattering angle of less than about eight degrees;
    an optical constraining layer having a second refractive index and disposed on one of said surfaces of said light guide; and
    an optical absorbing layer having a third refractive index and disposed on said optical constraining layer;
    said third refractive index being greater than said second refractive index and said second refractive index being slightly less than said first refractive index.

2. The homogenizer of claim 1 further comprising:
    a second constraining layer having said second refractive index and disposed on a surface of said light guide opposite said one surface; and
    a second absorbing layer having said third refractive index and disposed on said second constraining layer.

3. The homogenizer of claim 2 wherein said optical constraining layers each comprises a pressure sensitive adhesive and said optical absorbing layers each comprises a black polyimide.

4. The homogenizer of claim 1 wherein said light guide is acrylic with a refractive index of 1.4893, said optical constraining layer is an acrylic pressure sensitive adhesive having a refractive index of 1.4800, and said optical absorbing layer is a black polyimide with a refractive index of between 1.65 and 1.676.

5. The homogenizer of claim 1 wherein said mild diffuser has a controlled scattering angle of +/- five degree full-width half maximum scatter.

6. The homogenizer of claim 1 wherein said mild diffuser is positioned directly in front of and adjacent said light guide entrance.

7. The homogenizer of claim 1 wherein said mild diffuser is embossed on said light guide entrance.

8. An optical light guide for distributing light comprising:
a transparent slab light guide having a first refractive index, an entrance with a mild diffuser surface embossed thereon, said mild diffuser surface having a controlled scattering angle of less than about eight degrees, a constant cross-section region, and a wedge shaped light extraction region;
said constant cross-section region including an upper and a lower surface;
optical constraining layers having a second refractive index disposed on said upper and lower surfaces; and
optical absorbing layers having a third refractive index disposed on said optical constraining layers,
said third refractive index being greater than said second refractive index and said second refractive index being slightly less than said first refractive index.

9. The optical light guide of claim 8 wherein said mild diffuser surface has a controlled scattering angle of less than +/- five degree full-width half-maximum scatter.

10. In combination, an array of discrete collimated light sources, a homogenizer comprising
a light extraction guide having a first refractive index, said light guide having an entrance, an upper surface, and a lower surface,
an optical constraining layer having a second refractive index and disposed on one of said surfaces of said light guide, and
an optical absorbing layer having a third refractive index and disposed on said optical constraining layer, said third refractive index being greater than said second refractive index and said second refractive index being slightly less than said first refractive index, and
a mild diffuser covering said entrance, said discrete collimated light sources directing collimated light through said mild diffuser into said light extraction guide and said diffuser having a controlled scattering angle of less than eight degrees.

11. The combination of claim 10, wherein said mild diffuser has a controlled light scattering angle of less than +/- degree full-width half-maximum scatter.

12. The combination of claim 10 wherein said array of discrete collimated light sources comprises a plurality of non-imaging collimators optically driven from a plurality of optical fibers.

13. The combination in accordance with claim 12 wherein said homogenizer further comprises
a second optical constraining layer having said second refractive index and disposed on a surface of said light guide opposite to said one surface, and
a second absorbing layer having said third refractive index and disposed on said second optical constraining layer.

14. The combination of claim 13 wherein said optical constraining layers each comprises a pressure sensitive adhesive and said optical absorbing layers each comprises a black polyimide.

15. The combination of claim 12 wherein said light extraction guide is a transparent slab of constant cross section and said mild diffuser is embossed on said slab at said light guide entrance.

16. The combination of claim 12 wherein said light extraction guide has an exit surface further comprising a wedge shaped light extraction guide positioned adjacent said exit surface.

* * * * *